(12) United States Patent
Kim

(10) Patent No.: US 10,658,858 B2
(45) Date of Patent: May 19, 2020

(54) METHOD AND APPARATUS WITH BATTERY CHARGING CONTROL

(71) Applicant: SAMSUNG ELECTRONICS CO., LTD., Suwon-si (KR)

(72) Inventor: YoungJae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 15/655,969

(22) Filed: Jul. 21, 2017

(65) Prior Publication Data

US 2018/0097370 A1    Apr. 5, 2018

(30) Foreign Application Priority Data

Oct. 5, 2016  (KR) .................. 10-2016-0128232

(51) Int. Cl.
*H02J 7/00* (2006.01)
*G01G 19/00* (2006.01)

(52) U.S. Cl.
CPC .............. *H02J 7/007* (2013.01); *G01G 19/00* (2013.01); *H02J 7/0014* (2013.01); *H02J 7/0021* (2013.01); *H02J 7/0047* (2013.01); *H02J 7/00034* (2020.01); *H02J 7/0048* (2020.01); *Y02T 10/7055* (2013.01)

(58) Field of Classification Search
CPC ............................................ G01R 31/36–396
See application file for complete search history.

(56) References Cited

U.S. PATENT DOCUMENTS

| | | | |
|---|---|---|---|
| 7,821,225 B2 | 10/2010 | Chou et al. | |
| 8,115,446 B2 | 2/2012 | Piccard et al. | |
| 8,917,061 B2 | 12/2014 | Zhu | |
| 9,013,147 B2 | 4/2015 | Ke | |
| 2008/0191663 A1 | 8/2008 | Fowler et al. | |
| 2010/0042345 A1* | 2/2010 | Kang | G01R 31/389 702/65 |
| 2010/0117593 A1* | 5/2010 | Piccard | H02J 7/0018 320/104 |
| 2010/0131218 A1* | 5/2010 | Xu | H01M 10/121 702/63 |
| 2010/0247988 A1 | 9/2010 | Okumura et al. | |
| 2016/0105039 A1 | 4/2016 | Jeon et al. | |
| 2016/0118830 A1 | 4/2016 | Jeon et al. | |
| 2016/0311328 A1 | 10/2016 | Kim et al. | |

(Continued)

FOREIGN PATENT DOCUMENTS

| | | |
|---|---|---|
| EP | 0 649 576 B1 | 5/2003 |
| JP | 11-113185 A | 4/1999 |
| JP | 2008-189065 A | 8/2008 |

(Continued)

*Primary Examiner* — David V Henze-Gongola
(74) *Attorney, Agent, or Firm* — NSIP Law

(57) ABSTRACT

A method of controlling the charging of a battery includes determining plural pieces of state information of a battery unit based on a sensed physical quantity of the battery unit, calculating a weight of the battery unit based on the pieces of state information and a correspondence value of each of the plural pieces of state information, and defining, based on the weight, control information corresponding to an input physical quantity in a charging physical quantity of the battery unit, where the input physical quantity is input to a converter of the battery unit.

24 Claims, 14 Drawing Sheets

(56) References Cited

U.S. PATENT DOCUMENTS

2017/0141588 A1   5/2017  Kim
2017/0179736 A1   6/2017  Kim et al.

FOREIGN PATENT DOCUMENTS

| JP | 2009-55690 A | 3/2009 |
|----|----|----|
| JP | 4343173 B2 | 10/2009 |
| KR | 10-2012-0042967 A | 5/2012 |
| KR | 10-1142607 B1 | 5/2012 |
| KR | 10-2014-0075087 A | 6/2014 |
| KR | 10-1500547 B1 | 3/2015 |

\* cited by examiner

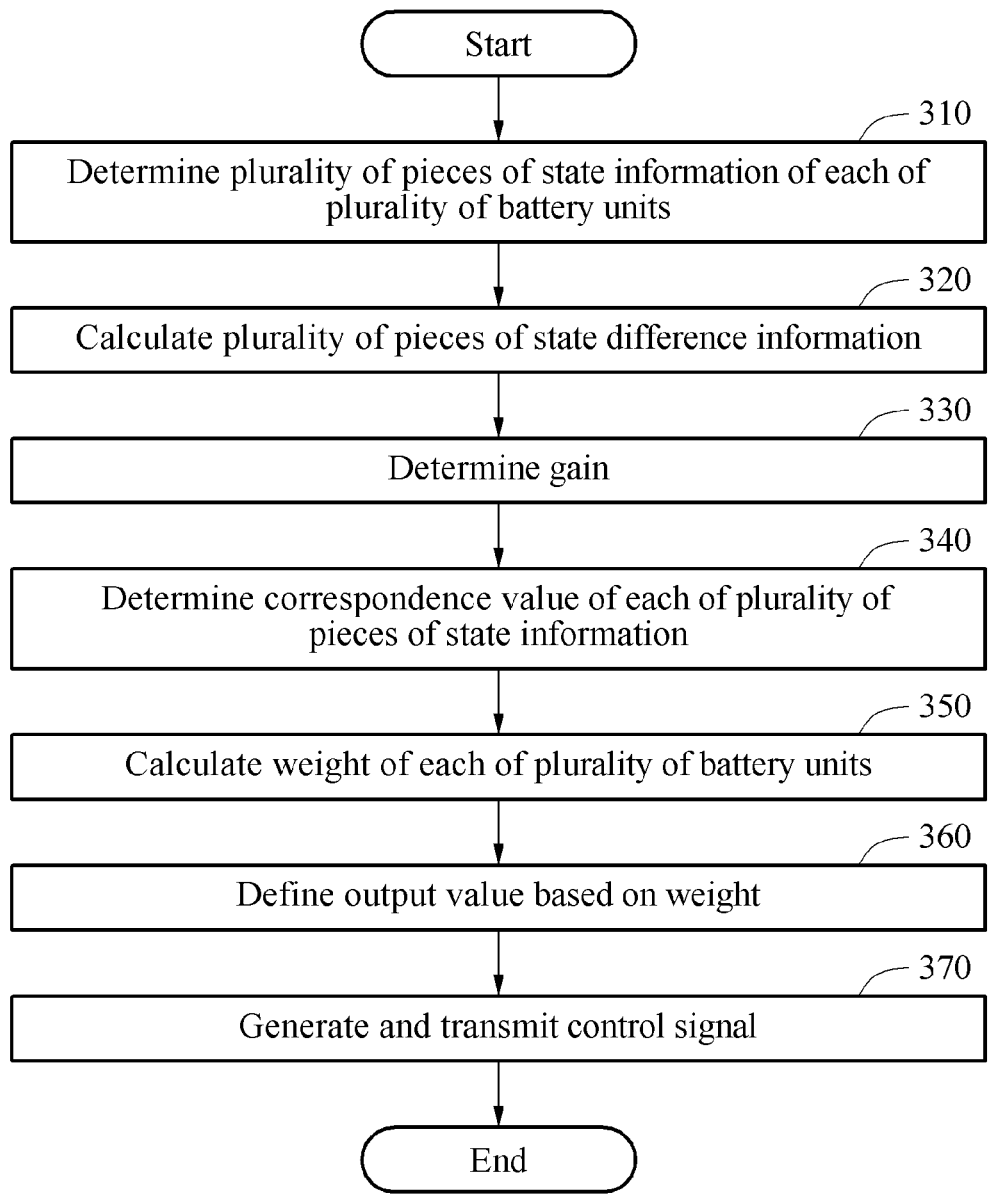

METHOD AND APPARATUS WITH BATTERY CHARGING CONTROL

CROSS-REFERENCE TO RELATED APPLICATIONS

This application claims the benefit under 35 U.S.C. § 119(a) of Korean Patent Application No. 10-2016-0128232 filed on Oct. 5, 2016 in the Korean Intellectual Property Office, the entire disclosure of which is incorporated herein by reference for all purposes.

BACKGROUND

1. Field

The following description relates to a method and apparatus for controlling the charging of a battery.

2. Description of Related Art

In response to repeating charging and discharging of cells that constitute a battery, a chemical difference or an aging difference, etc., may occur between the cells. Due to the chemical or aging difference, a voltage deviation or a capacity deviation may occur between the cells. Accordingly, overcharging or over-discharging may occur in a specific cell, which may lead to decreasing the capacity of a battery and depleting the battery. Accordingly, a lifespan of the battery may be reduced.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a processor-implemented method of controlling the charging of a battery includes determining plural pieces of state information of a battery unit based on a sensed physical quantity of the battery unit and calculating a weight of the battery unit based on the plural pieces of state information and a correspondence value of each of the pieces of state information. The method also includes defining, based on the weight, control information corresponding to an input physical quantity in a charging physical quantity of the battery unit, where the input physical quantity is input to a converter of the battery unit.

The method may further include controlling charging of the battery unit based on the defined control information. The method may further include determining the correspondence value of each of the pieces of state information based on a result of comparing each of the pieces of state information and statistical information corresponding to each of the pieces of state information.

The determining of the correspondence value may include determining a correspondence value of first state information from among a plurality of correspondence values based on a result of comparing the first state information with average information corresponding to the first state information, and determining a correspondence value of second state information from among the plurality of correspondence values based on a result of comparing the second state information with average information corresponding to the second state information.

The calculating of the weight may include defining a first weight component based on the correspondence value of the first state information and a value acquired by deducting the first state information from a preset value and the correspondence value of the first state information, defining a second weight component based on a correspondence value of the second state information, a gain, and a ratio between second state difference information and average information corresponding to the second state information, and defining a sum of the first weight component and the second weight component as the weight. The second state difference information may indicate a difference between the second state information and the average information corresponding to the second state information.

The gain may be determined within a range that is based on first and second state difference information, where first state difference information is information indicating a difference between the first state information and the average information corresponding to the first state information.

The plural pieces of state information may include available capacity information of the battery unit and charge state information of the battery unit. The calculating of the weight may include performing an operation based on a correspondence value of the charge state information, average state information of the battery unit and another battery unit, difference information between the charge state information and the average state information, the available capacity information, and a correspondence value of the available capacity information, and defining a result of the operation as the weight.

The defining of the control information may include performing an operation based on the weight and an output value corresponding to an output physical quantity of a charger, and defining a result of the operation as the control information.

The defining of the control information may include determining a ratio of the weight to a sum of the weight and another weight corresponding to another battery unit, performing an operation based on the ratio and a physical quantity utilized by a load, and defining a result of the operation as the control information.

The method may further include generating a control signal based on the physical quantity utilized by the load in response to an occurrence of a charge event, and transmitting the control signal to a charger.

Charging of the battery unit may be performed based on a remaining physical quantity excluding the sensed physical quantity, and the converter may be configured to convert the input physical quantity and to output the converted physical quantity to a load.

The method may further include transmitting the control information to the converter or to a slave controller for controlling the converter.

In a general aspect, a non-transitory computer-readable storage medium stores instructions that, when executed by a processor, cause the processor to perform one or more or all operations described herein.

In a general aspect, a method of controlling the charging of a battery includes determining plural pieces of state information of a battery unit based on a sensed physical quantity of the battery unit, calculating a weight of the battery unit based on the plural pieces of state information and a correspondence value of each of the pieces of state information, and determining a ratio between the weight and a sum of the weight and another weight corresponding to another battery unit. The method includes defining, based on the ratio and a physical quantity utilized by a load, control information corresponding to an input physical quantity in a charging physical quantity of the battery unit, where the input physical quantity is input to a converter of the battery unit.

The defining may include performing an operation based on the ratio and the physical quantity utilized by the load, and defining a result of the operation as the control information.

The method may further include determining the correspondence value of each of the pieces of state information based on a result of comparing each of the pieces of state information and statistical information corresponding to each of the pieces of state information.

The determining of the correspondence value may include determining a correspondence value of first state information from among a plurality of correspondence values based on a result of comparing the first state information with average information corresponding to the first state information, and determining a correspondence value of second state information from among the plurality of correspondence values based on a result of comparing the second state information with average information corresponding to the second state information.

The calculating of the weight may include determining a first weight component based on the correspondence value of the first state information and a value acquired by deducting the first state information from a preset value and the correspondence value of the first state information. The calculating of the weight may further include defining a second weight component based on a correspondence value of the second state information, a gain, and a ratio between second state difference information and average information corresponding to the second state information. The calculating may include defining a sum of the first weight component and the second weight component as the weight, and the second state difference information may indicate a difference between the second state information and the average information corresponding to the second state information.

The gain may be determined within a range that is predetermined based on first state difference information and the second state difference information. The first state difference information is information indicating a difference between the first state information and the average information corresponding to the first state information and the second state difference information.

The plural pieces of state information may include available capacity information of the battery unit and charge state information of the battery unit, and the calculating of the weight may include performing an operation based on a correspondence value of the charge state information, average state information of the battery unit and another battery unit, difference information between the charge state information and the average state information, the available capacity information, and a correspondence value of the available capacity information; and defining a result of the operation as the weight.

The method may further include generating a control signal based on the physical quantity utilized in response to an occurrence of a charge event, and transmitting the control signal to a charger.

Charging of the battery unit may be performed based on a remaining physical quantity excluding the sensed physical quantity. The converter may be configured to convert the input physical quantity and to output the converted physical quantity to the load.

In a general aspect, an apparatus for controlling a charging of a battery includes a controller and a communicator. The controller is configured to determine plural pieces of state information of a battery unit based on a sensed physical quantity of the battery unit and to calculate a weight of the battery unit based on the pieces of state information and a correspondence value of each of the pieces of state information. The controller is also configured to define, based on the weight, control information corresponding to an input physical quantity input in a charging physical quantity of the battery unit, where the input physical quantity is input to a converter of the battery unit. The communicator is configured to transmit a control signal based on the control information.

The controller may be further configured to determine a ratio of the weight to a sum of the weight and another weight corresponding to another battery unit, to perform an operation based on the ratio and a physical quantity utilized by a load, and to define a result of the operation as the control information.

Other features and aspects will be apparent from the following detailed description, drawings, and claims.

BRIEF DESCRIPTION OF THE DRAWINGS

FIG. 3 is a flowchart illustrating an example of a method for controlling a charging of a battery.

Figure 1A:
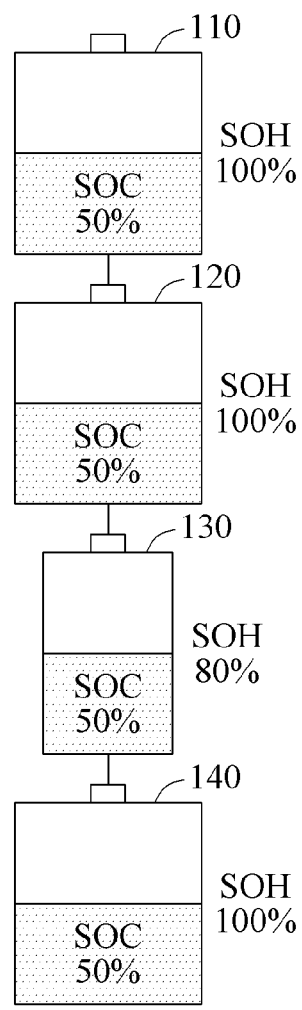
FIGS. 1A through 2C illustrate examples of charging a battery pack that includes a battery unit having unequal state information.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed as will be apparent after an understanding of the application, with the exception of operations necessarily occurring in a certain order. Also, descriptions of functions and constructions that are well known may be omitted for increased clarity or conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the application.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

When describing the examples with reference to the accompanying drawings, like reference numerals refer to like constituent elements and a repeated description related thereto is omitted. When it is determined discussions related to a related known operation or configuration that may make the purpose of the examples unnecessarily ambiguous in describing the examples, such discussions in the detailed description is omitted here.

Hereinafter, reference will now be made in detail to examples with reference to the accompanying drawings, wherein like reference numerals refer to like elements throughout. FIGS. 1A through 2C illustrate example conditions of charging a battery pack that includes battery units having unequal state information in the examples.

FIG. 1A illustrates state information of each of battery units 110, 120, 130, and 140. Each of battery units 110, 120, 130, and 140 may represent respective battery cells or battery modules. In the example of FIG. 1A, charge state information, for example, state of charge (SOC), of each of battery units 110, 120, 130, and 140 is shown to be equal. Available capacity information, for example, state of health (SOH), of the battery unit 130 differs from available capacity information, for example, SOH, of the battery units 110, 120, and 140. In the example of FIG. 1A, SOH is shown to be unequal. Thus, here in FIG. 1A, charging of a battery pack including the battery unit 130 having unequal SOH is assumed.

Figure 1B:
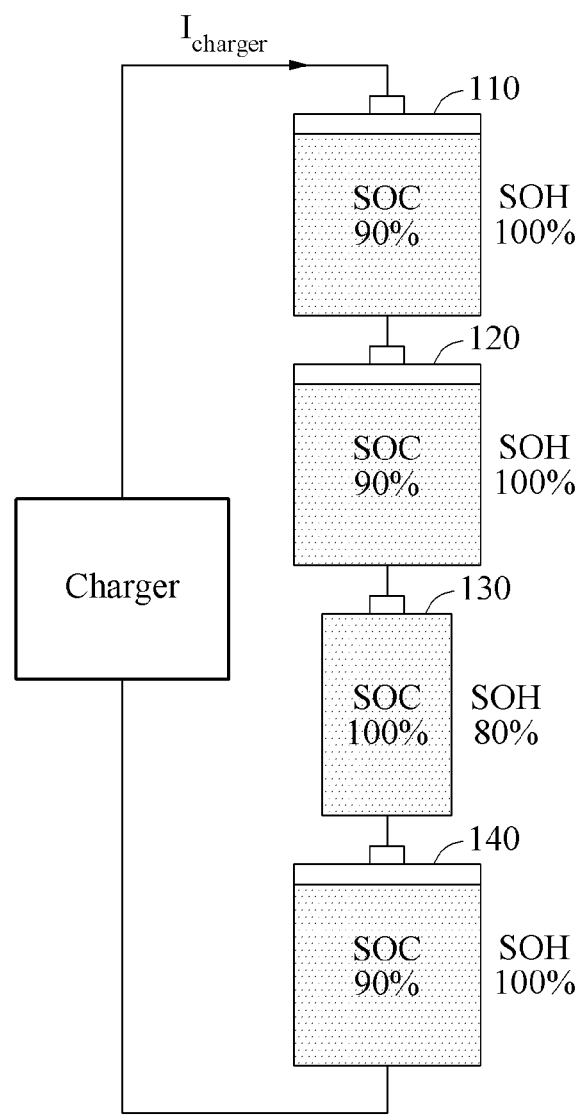
Figure 1C:
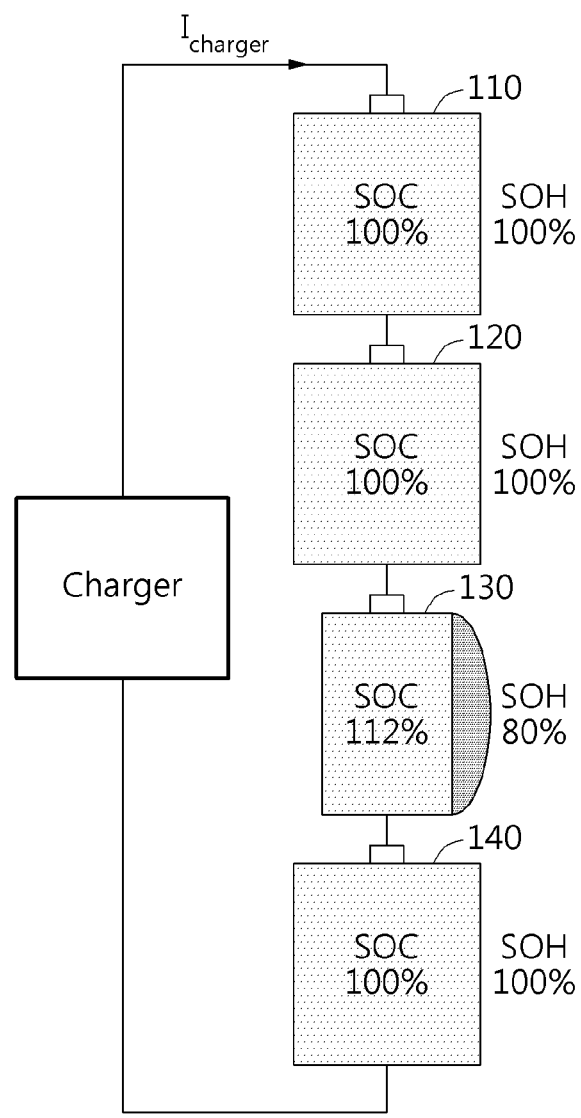

Referring to FIG. 1B, the battery unit 130 is shown to be fully charged and the battery units 110, 120, and 140 are shown to be not fully charged. Because the battery units 110, 120, and 140 are not fully charged, the entire efficiency of the battery pack decreases. Referring to FIG. 10, the battery 130 is shown to be overcharged and the battery units 110, 120, and 140 are shown to be fully charged. In one example, a degradation rate of the battery unit 130 increases.

Figure 2A:
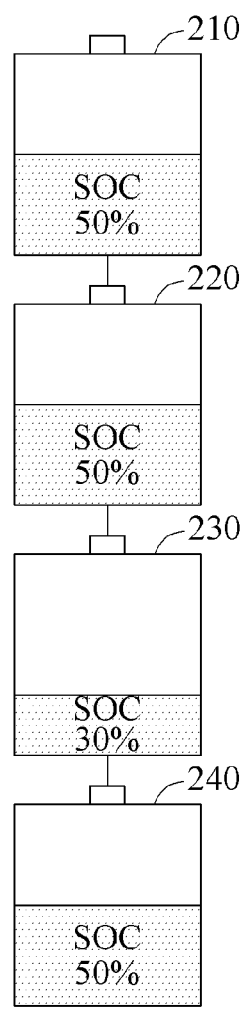

FIG. 2A illustrates state information of each of battery units 210, 220, 230, and 240. SOH of each of battery units 210, 220, 230, and 240 is shown to be equal. In the example of FIG. 2A, SOC of the battery unit 230 is shown to differ from SOC of the battery units 210, 220, and 240. In the example of FIG. 2A, SOC is unequal and, thus, charging of a battery pack including the battery unit 230 having unequal SOC is assumed.

Figure 2B:
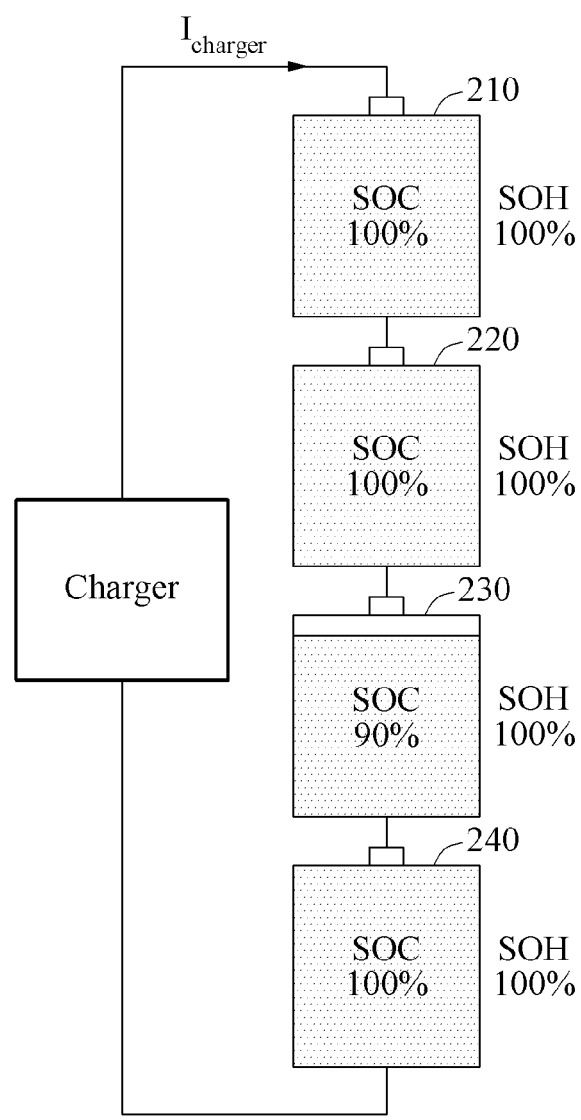

Referring to FIG. 2B, the battery unit 230 is not fully charged and the battery units 210, 220, and 240 are fully charged. Because the battery unit 230 is not fully charged, the entire efficiency of the battery pack may decrease.

Figure 2C:
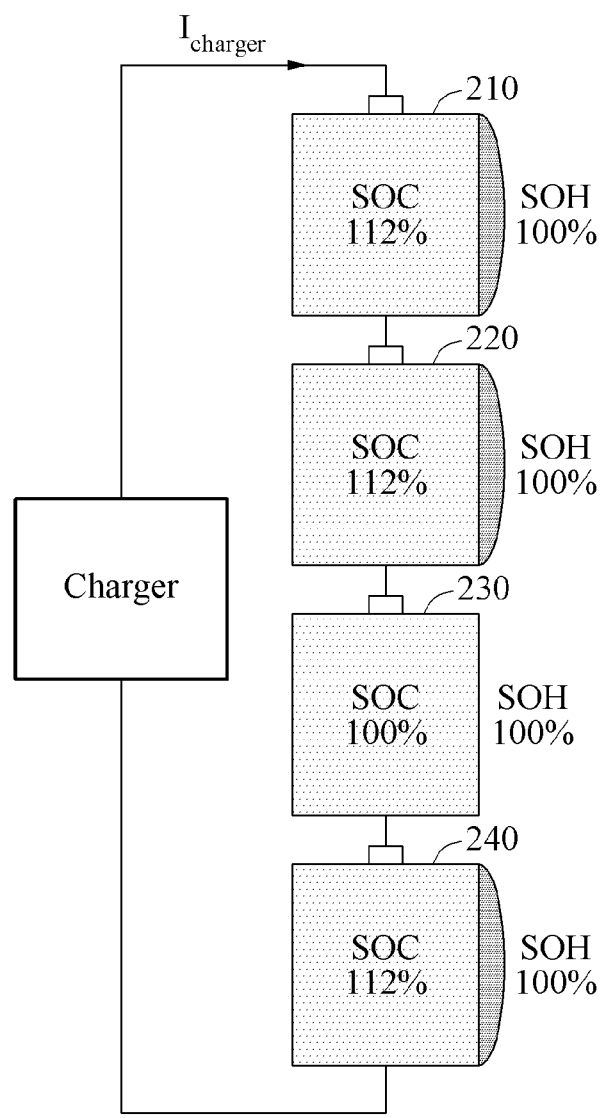

Referring to FIG. 2C, the battery unit 230 is fully charged and the battery units 210, 220, and 240 are overcharged. In one example, a degradation rate of the battery units 210, 220, and 240 may increase. If a charging/discharging cycle of a battery pack including a battery pack having unequal state information, for example, SOC, repeats, a lifespan degradation may quickly proceed and an energy utilization rate may decrease.

FIG. 3 illustrates an example of a method of controlling a charging of a battery. The battery charging control method of FIG. 3 may be performed at a battery charging control apparatus, for example.

Referring to FIG. 3, in operation 310, the battery charging control apparatus determines pieces of state information of each battery unit. The battery charging control apparatus may determine pieces of state information of each battery unit based on a physical quantity of the battery unit. Physical quantity data may be, for example, one of voltage data, current data, temperature data, and impedance data, or any combination thereof. The battery unit may represent a battery cell or a battery module.

The pieces of state information may include available capacity information, for example, SOH, and charge state information, for example, SOC, of a battery unit. The battery charging control apparatus may calculate average state information associated with the battery units. For example, the battery charging control apparatus calculates the average SOH and the average SOC associated with the battery units according to the below Equation 1. In Equation 1, N denotes a number of battery units.

$$SOH_{average} = (SOH_1 + SOH_2 + \ldots + SOH_N)/N$$

$$SOC_{average} = (SOC_1 + SOC_2 + \ldots + SOC_N)/N \quad \text{Equation 1}$$

In operation 320, the battery charging control apparatus calculates pieces of state difference information. The pieces of state difference information may include, for example, $\Delta SOH$ indicating a difference between SOH of the battery unit and the average SOH and $\Delta SOC$ indicating a difference between SOC of the battery unit and the average SOC. The battery charging control apparatus may calculate $\Delta SOH$ and $\Delta SOC$ of each of the battery units according to the below Equation 2, for example.

$$\Delta SOH_n = SOH_n - SOH_{average}, n=1,\ldots,N$$

$$\Delta SOC_n = SOC_n - SOC_{average}, n=1,\ldots,N \quad \text{Equation 2}$$

The battery charging control apparatus may calculate $\Delta SOH_1$, $\Delta SOH_2$, ..., and $\Delta SOH_N$, as well as $\Delta SOC_1$, $\Delta SOC_2$, ..., and $\Delta SOC_N$. In operation 330, the battery charging control apparatus determines a gain. In one example, the battery charging control apparatus determines a gain based on at least one piece of state difference information of the battery unit. For example, the battery charging control apparatus verifies the range that includes $\Delta SOH_n$, $\Delta SOC_n$, $\Sigma|\Delta SOH_n|$, $\Sigma|\Delta SOC_n|$, or $\Sigma|\Delta SOH_n| + \Sigma|\Delta SOC_n|$, and determines a gain based on the verified range. Here, $\Sigma|\Delta SOH_n| = |\Delta SOH_1| + |\Delta SOH_2| + \ldots + |\Delta SOH_N|$, and $\Sigma|\Delta SOC_n| = |\Delta SOC_1| + |\Delta SOC_2| + \ldots + |\Delta SOC_N|$.

Hereinafter, an example of determining a gain based on $\Sigma|\Delta SOC_n| + |\Delta SOH_n|$ is described. However, it is provided as an example only and the gain may be determined based on one of $\Delta SOH_n$, $\Delta SOC_n$, $\Sigma|\Delta SOC_n|$, $\Sigma|\Delta SOH_n|$, and $\Sigma|\Delta SOH_n| + \Sigma|\Delta SOC_n|$, or a combination thereof. In one example, the range of $\Sigma|\Delta SOC_n| + |\Delta SOH_n|$ is defined as expressed by Equation 3. However, Equation 3 is provided below as an example only and the range of $\Sigma|\Delta SOC_n|+|\Delta SOH_n|$ is not limited thereto.

If $0<\Sigma|\Delta SOC_n|+|\Delta SOH_n|\leq 1$, gain $g$ is one of numbers greater than 0 and less than or equal to 1, If $1<\Sigma|\Delta SOC_n|+|\Delta SOH_n|<9$, gain $g$ is one of numbers greater than 1 and less than or equal to 6, If $9\leq\Sigma|\Delta SOC_n|+|\Delta SOH_n|$, gain $g$ is one of numbers greater than 6 and less than or equal to 10.     Equation 3

As an example for Equation 3, the battery charging control apparatus determines 0.1 as a gain if $\Sigma|\Delta SOC_n|+|\Delta SOH_n|$ belongs to a first range, may determine 3 as a gain if $\Sigma|\Delta SOC_n|+|\Delta SOH_n|$ belongs to a second range, and may determine 7 as a gain if $\Sigma|\Delta SOC_n|+|\Delta SOH_n|$ belongs to a third range.

In operation 340, the battery charging control apparatus determines a correspondence value of each of the pieces of state information based on each of the pieces of state information. In one example, the battery charging control apparatus determines a correspondence value of SOH based on a result of comparing SOH of the battery unit and $SOH_{average}$. Also, the battery charging control apparatus may determine a correspondence value of SOC based on a result of comparing SOC of the battery unit and $SOC_{average}$. For example, the battery charging control apparatus may determine a correspondence value of each of SOH and SOC of the battery unit according to the below Equation 4.

If $\Delta SOH_n>0, \alpha_n=-1$, and if $\Delta SOH_n<0, \alpha_n=+1$.

If $\Delta SOC_n>0, \beta_n=+1$, and if $\Delta SOC_n<0, \beta_n=-1$.     Equation 4

In Equation 4, $\alpha_n$ denotes a correspondence value of $SOH_n$, and $\beta_n$ denotes a correspondence value of $SOC_n$. If $SOH_n>SOH_{average}$, the battery charging control apparatus may define the correspondence value $\alpha_n$ as $-1$. If $SOH_n<SOH_{average}$, the battery charging control apparatus may define the correspondence value $\alpha_n$ as $+1$. If $SOC_n>SOC_{average}$, the battery charging control apparatus may define $\beta_n$ as $+1$. If $SOC_n<SOC_{average}$, the battery charging control apparatus may define $\beta_n$ as $-1$.

If $\Delta SOH_n=0$, the battery charging control apparatus may define $\alpha_n$ as $-1$ or any value between $-1$ and 0. Also, if $\Delta SOC_n=0$, the battery charging control apparatus may define $\beta_n$ as $-1$ or any value between $-1$ and 0. A numerical value indicating a correspondence value of the plurality of pieces of state information is provided as an example only and is not limited thereto.

In operation 350, the battery charging control apparatus calculates a weight of each of the battery units. In one example, the battery charging control apparatus calculates a weight based on a correspondence value of charge state information of a battery unit, average charge state information, difference information between the charge state information and the average charge state information, available capacity information, and a correspondence of the available capacity information. For example, the battery charging control apparatus calculates a weight $\varepsilon_n$ according to the below Equation 5.

$\varepsilon_n = \alpha_n \times (1-SOH_n) + \beta_n \times g \times \Delta SOC_n / SOC_{average}$     Equation 5

In operation 360, the battery charging control apparatus defines an output value of a converter based on the weight. In detail, the battery charging control apparatus may determine an output value of a converter of each of the battery units based on a weight of each of the battery units. The converter may be, for example, a low voltage direct current (DC) to DC (LDC) convertefr.

In one example, the battery charging control apparatus defines an output value of a converter of each of the battery units according to the below Equation 6.

$I_{target\_n} = \varepsilon_n \times I_{charger}$     Equation 6

The output value $I_{targe\_n}$ corresponds to an output current of a converter of battery unit_n. In Equation 6, $I_{charger}$ denotes an output physical quantity of a charger. The charger may include, for example, an on-board charger or an off-board charger. Depending on examples, the battery charging control apparatus may define $\varepsilon_n \times I_{charger}$ as an input value of the converter of each of the battery units. The example is described with reference to FIG. 4A.

In another example, the battery charging control apparatus may define an output value according to the below Equation 7.

$k_n = \varepsilon_n / \Sigma|\varepsilon_n|, \Sigma|\varepsilon_n| = |\varepsilon_1| + |\varepsilon_n| + \ldots + |\varepsilon_N|$ $I_{target\_n} = k_n \times I_{target\_total}$ or $P_{target\_n} = k_n \times P_{target\_total}$     Equation 7

$I_{target\_n}$ corresponds to an output current of a converter of battery unit_n. Also, $P_{target\_n}$ corresponds to an output current of the converter of battery unit_n. In Equation 7, $I_{target\_total}$ or $P_{target\_total}$ denotes a required physical quantity of a load. The load may include a low voltage load. The low voltage load refers to a load that uses an output physical quantity of the converter as a power source. The low voltage load includes a load, for example, for a temperature control system, etc., that operates at low voltage, for example, 12 to 14 $V_{DC}$, and/or an auxiliary power storage configured to store the output physical quantity of the converter.

The battery charging control apparatus may calculate a ratio $k_n$ of $\varepsilon_n$ to a sum of weights of the plurality of battery units. The battery charging control apparatus may define the output value of the converter of battery unit_n based on $k_n$ and the required physical quantity of the low voltage load. The battery charging control apparatus may define $k_n \times I_{target\_total}$ or $k_n \times P_{target\_total}$ as an input value of the converter. This example is described with reference to FIG. 4B.

In operation 370, the battery charging control apparatus generates a control signal corresponding to the output value and transmits the generated control signal. For example, the battery charging control apparatus generates a control signal corresponding to $I_{target\_n}$. The battery charging control apparatus may transmit the control signal to the converter of battery unit_n or a controller that controls the converter of battery unit_n.

The converter operates in response to the control signal. Accordingly, a portion of the charge physical quantity for battery unit_n is input to the converter. For example, if charge physical quantity for battery unit_n=$I_n$, a portion of $I_n$ may be input to the converter so that the converter may output $I_{target\_n}$ to the low voltage load. Battery unit_n may be charged with remaining current $I_n - I_{target\_n}$.

A portion of the charge physical quantity of each of the battery units may be supplied to the low voltage load based on an operation of the battery charging control apparatus. Accordingly, although the battery units are in different states, the battery units may be equally charged. For example, a charge rate of a battery unit having relatively poor SOH, for example, a battery unit having SOH less than $SOH_{average}$ is less than a charge rate of a battery unit having a relatively excellent SOH, for example, a battery unit having SOH greater than $SOH_{average}$. That is, the battery unit having relatively poor SOH is charged at a relatively low rate compared to the battery unit having the relatively excellent SOH. Accordingly, the battery units are equally charged regardless of different SOH.

Figure 4A:
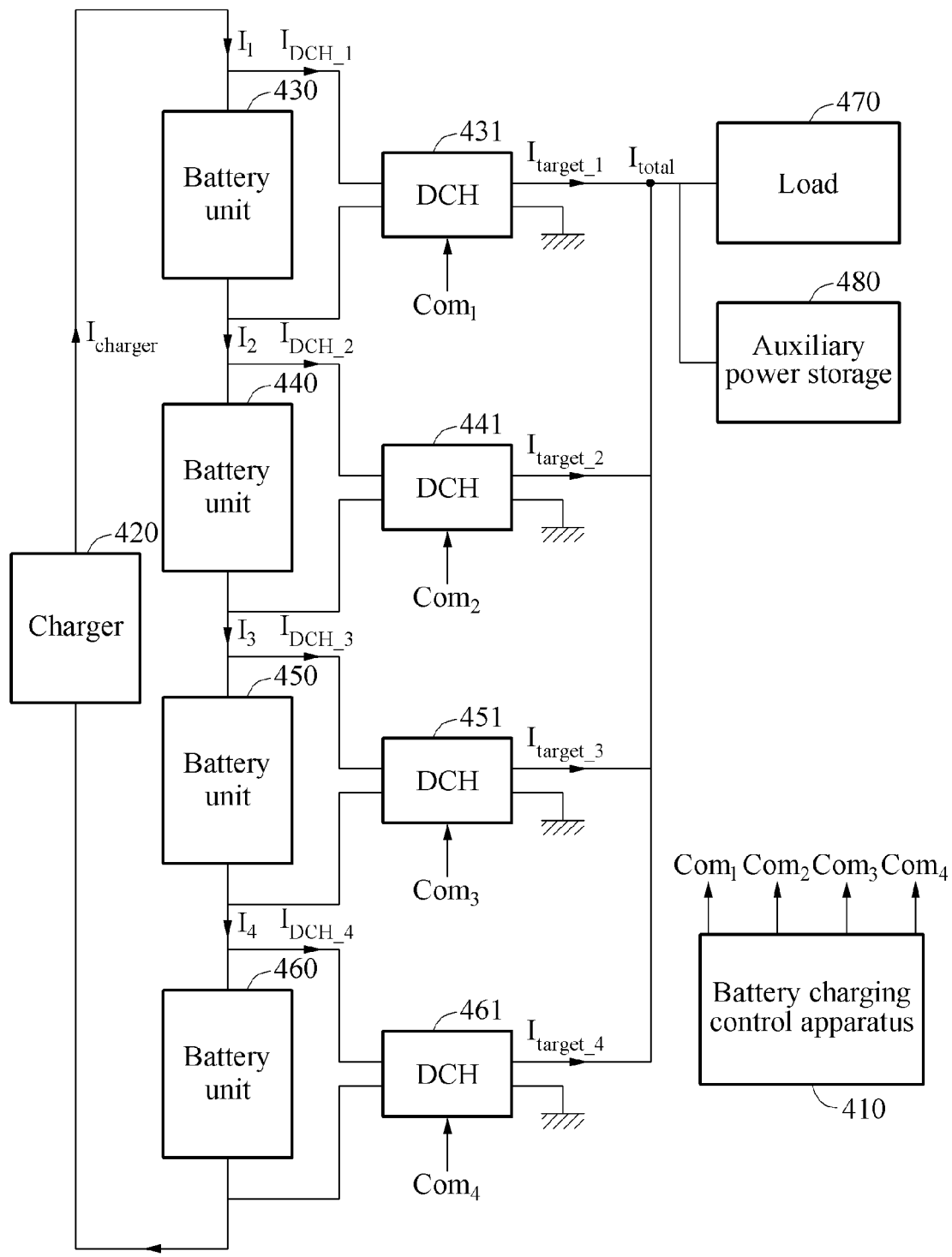
FIGS. 4A and 4B illustrate examples of an operation of a battery charging control apparatus.
Figure 4B:
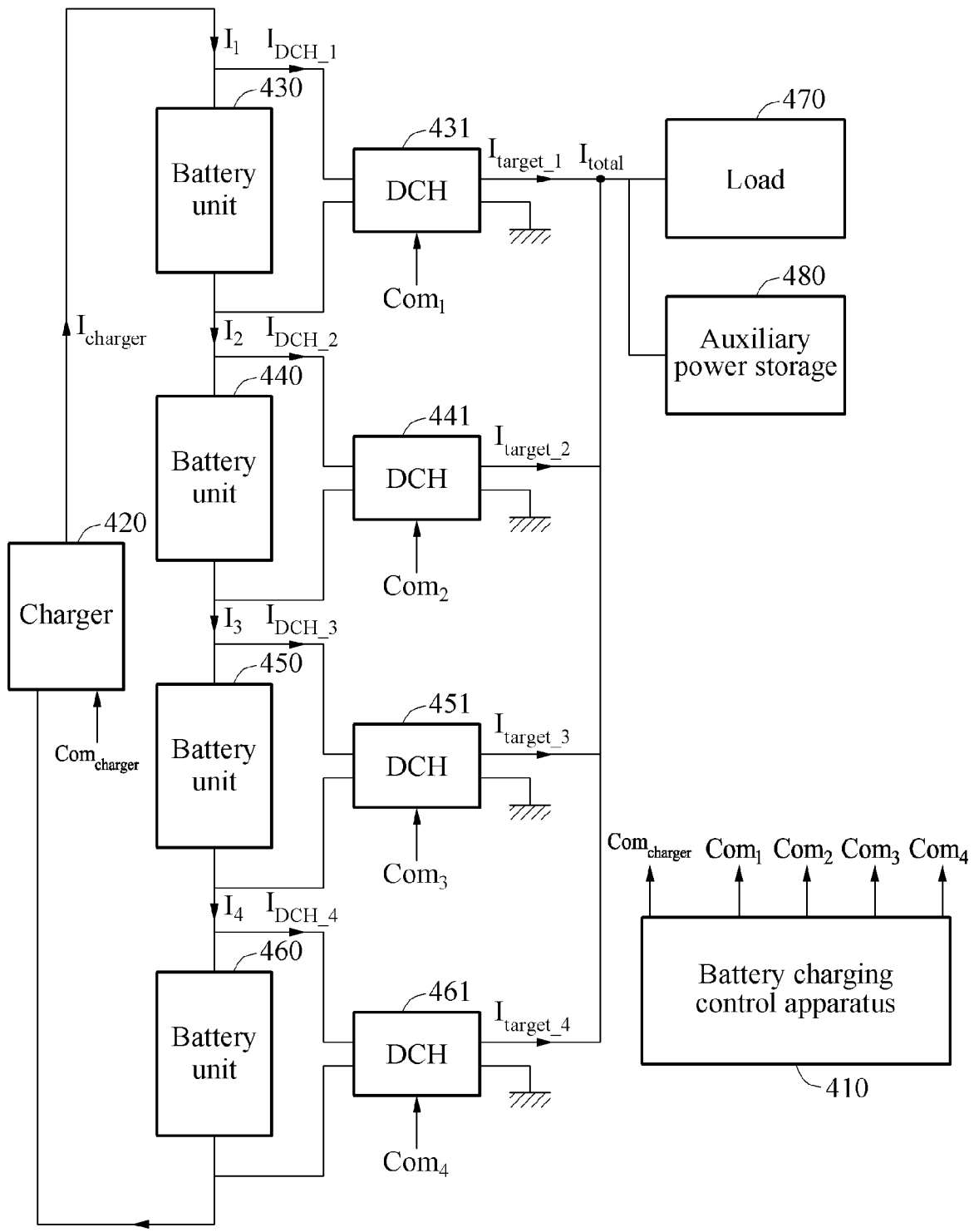

FIGS. 4A and 4B illustrate examples of an operation of a battery charging control apparatus. Referring to FIG. 4A, output physical quantity $I_{charger}$ is output from a charger 420. In one example, a battery charging control apparatus 410 calculates a weight of each of battery units 430, 440, 450, and 460 according to Equation 5. Thus, $\varepsilon_1$, $\varepsilon_2$, $\varepsilon_3$, and $\varepsilon_4$ may be calculated.

The battery charging control apparatus 410 may define an output value of each of differential charge handlers (DCHs) 431, 441, 451, and 461, based on the weight. Here, each of DCHs 431, 441, 451, and 461 includes a converter, for example, a DC-DC converter. The battery charging control apparatus 410 may define an output value of each converter. For example, according to Equation 6 as shown above, the battery charging control apparatus 410 defines the output values as follows, respectively:

$$I_{target\_1} = \varepsilon_1 \times I_{charger},$$

$$I_{target\_2} = \varepsilon_2 \times I_{charger},$$

$$I_{target\_3} = \varepsilon_3 \times I_{charger}, \text{ and}$$

$$I_{target\_4} = \varepsilon_4 \times I_{charger}.$$

Table 1 and Table 2 below show examples of information used when the battery charging control apparatus 410 defines $I_{target\_1}$ through $I_{target\_4}$.

TABLE 1

|  | $SOH_n$ | $SOC_n$ | $SOH_{average}$ | $SOC_{average}$ | $\Delta SOH_n$ | $\Delta SOC_n$ |
|---|---|---|---|---|---|---|
| Battery unit 430 | 0.88 | 0.7 | 0.8575 | 0.67 | 0.0225 | 0.03 |
| Battery unit 440 | 0.85 | 0.65 |  |  | −0.0075 | −0.02 |
| Battery unit 450 | 0.85 | 0.63 |  |  | −0.0075 | −0.04 |
| Battery unit 460 | 0.85 | 0.7 |  |  | −0.0075 | 0.03 |

TABLE 2

|  | $\alpha_n$ | $\beta_n$ | Weight $\varepsilon_n$, g = 0.1 | Output value $I_{target\_n}$, $I_{charger}$ = 30 A |
|---|---|---|---|---|
| Battery unit 430 | −1 | 1 | −0.115 | 3.45 = 0.115 × 30 |
| Battery unit 440 | 1 | −1 | 0.147 | 4.41 = 0.147 × 30 |
| Battery unit 450 | 1 | −1 | 0.144 | 4.32 = 0.144 × 30 |
| Battery unit 460 | 1 | 1 | 0.154 | 4.62 = 0.154 × 30 |

If $\Delta SOC$ is a negative number, the battery charging control apparatus 410 may calculate the weight by applying an absolute value to $\Delta SOC$. Also, if the weight is a negative number, the battery charging control apparatus 410 may define the output value by applying the absolute value.

The battery charging control apparatus 410 may generate a control signal for controlling DCHs 431, 441, 451, and 461, based on $I_{target\_1}$ to $I_{target\_4}$, respectively. The battery charging control signal 410 transmits the control signal, for example, command$_1$ (com$_1$), to the DCH 431 or a controller that controls the DCH 431. The DCH 431 may operate based on the control signal com$_1$. Accordingly, in charge current $I_1$ for the battery unit 430, charge current $I_{DCH\_1}$ is input to the DCH 431. The DCH 431 outputs $I_{target\_1}$ to a load 470 and/or an auxiliary power storage 480 through step down of $I_{DCH\_1}$ from high voltage, for example, 220 to 500 $V_{DC}$, to low voltage, for example, 12 to 14 $V_{DC}$.

Because $I_{DCH\_1}$ in $I_1$ is input to the DCH 431, charge current for the battery unit 440 that is connected to the battery unit 430 in series is $I_2 = I_1 - I_{DCH\_1}$. The DCH 441 of the battery unit 440 may operate based on a control signal, for example com$_2$. Accordingly, in charge current $I_2$ for the battery unit 440, $I_{DCH\_2}$ is input to the DCH 441. The DCH 441 outputs $I_{target\_2}$ to the load 470 and/or the auxiliary power storage 480 through step down of $I_{DCH\_2}$. Likewise, the DCH 451 of the battery unit 450 outputs $I_{target\_3}$ to the load 470 and/or the auxiliary power storage 480 through step down of $I_{DCH\_3}$, and the DCH 461 of the battery unit 460 outputs $I_{target\_4}$ to the load 470 and/or the auxiliary power storage 480 through step down of $I_{DCH\_4}$.

As described, the battery charging control apparatus 410 defines an output value of each of the DCHs 431, 441, 451, and 461. Depending on examples, the battery charging control apparatus 410 may define an input value for each of the DCHs 431, 441, 451, and 461. For example, the battery charging control apparatus 410 defines input values as $I_{DCH\_1} = \varepsilon_1 \times I_{charger}$, $I_{DCH\_2} = \varepsilon_2 \times I_{charger}$, $I_{DCH\_3} = \varepsilon_3 \times I_{charger}$, and $I_{DCH\_4} = \varepsilon_4 \times I_{charger}$, respectively. In the case of $I_{DCH\_n}$ and $I_{target\_n}$, voltage magnitudes may differ from each other and current magnitudes may be the same. Thus, the battery charging control apparatus 410 may define an input value of each of the DCHs 431, 441, 451, and 461 based on $I_{DCH\_n} = \varepsilon_n \times I_{charger}$. The aforementioned description may be applicable to generating and transmitting a control signal and operating each of the DCHs 431, 441, 451, and 461, and further description is omitted.

The battery units 430, 440, 450, and 460 may be in different states. In these examples, as described above with reference to FIGS. 1A through 2C, a portion of the battery units 430, 440, 450, and 460 may not be fully charged or may be overcharged. In one example, charge current of the battery units 430, 440, 450, and 460 is controlled based on state information of the battery units 430, 440, 450, and 460, respectively. Referring to Table 1, although the battery units 430 and 460 have an equal SOC, the SOH of the battery unit 460 is less than SOH of the battery unit 430. Thus, output current of the DCH 461 is controlled to be greater than output current of the DCH 431, for example. Also referring to Table 1, SOC of the battery unit 460 is greater than SOC of the battery units 440 and 450. Therefore, output current of the DCH 461 is controlled in such a way as to be greater than output current of the DCHs 441 and 451, for example.

Each of the DCHs 431, 441, 451, and 461 may output current having a different magnitude based on an operation of the battery charging control apparatus 410. Accordingly, the battery unit 460 may be charged at a relatively slow rate compared to the battery units 430, 440, and 450, and the battery units 430, 440, 450, and 460 may be fully charged at the same point in time. That is, the battery units 430, 440, 450, and 460 may be charged such that SOC of each of the battery units 430, 440, 450, and 460 becomes close to the maximum SOC at the same point in time. Equalization charging of the battery units 430, 440, 450, and 460 may be performed. Also, the entire efficiency or energy utilization rate of a battery pack that includes the battery units 430, 440, 450, and 460 may be enhanced. Additionally, during charging of the battery units 430, 440, 450, and 460, current may be supplied to the load 470. Alternatively, the auxiliary power storage 480 may be charged. Thus, the efficiency of a battery system or a device that includes the battery system may be enhanced.

Referring to an example of FIG. 4B, the battery charging control apparatus 410 generates a control signal com$_{charger}$ and transmits the generated control signal com$_{charger}$ to the charger 420, which differs from the example of FIG. 4A. The charger 420 operates in response to the control signal com$_{charger}$ and outputs an output physical quantity I$_{charger}$. Hereinafter, description is based on an example in which the battery charging control apparatus 410 generates the control signal com$_{charger}$.

According to the example, the battery charging control apparatus 410 estimates a required physical quantity of a low voltage load. The battery charging control apparatus 410 may estimate the required physical quantity of a load before I$_{charger}$ is output. However, it is provided as an example only and the battery charging control apparatus 410 may estimate the required physical quantity of the load after I$_{charger}$ is output.

The battery units 430, 440, 450, and 460, and/or the auxiliary power storage 480 may supply an electrical physical quantity, for example, voltage, current, power, etc., to the load 470. In an example, each of the battery units 430, 440, 450, and 460 may step down voltage of the electrical physical quantity of the corresponding DCH 431, 441, 451, or 461, and the load 470 may be supplied with the stepped-down electrical physical quantity. A voltage sensor and a current sensor may sense the electrical physical quantity supplied to the load 470, and the battery charging control apparatus 410 may estimate the required physical quantity of the load 470 based on the sensed electrical physical quantity. Also, the battery charging control apparatus 410 may estimate a required physical quantity of the auxiliary power storage 480 based on a charge state of the auxiliary power storage 480. For example, if the auxiliary power storage unit 480 is in a low charge state, the required physical quantity of the auxiliary power storage 480 is estimated to be high. In one example, the battery charging control apparatus 410 estimates the required physical quantity of the auxiliary power storage 480 based on difference information between a current charge stage of the auxiliary power storage 480 and a maximum charge state. A method of estimating a required physical quantity of a low voltage load is provided as an example and is not limited thereto.

The battery charging control apparatus 410 generates the control signal com$_{charger}$ corresponding to the required physical quantity of the low voltage load, and may transmit the generated control signal com$_{charger}$ to the charger 420. The charger 420 may determine intensity of I$_{charger}$ based on the required physical quantity of the low voltage load, and may output I$_{charger}$.

As described above with reference to FIG. 4A, the battery charging control apparatus 410 may calculate a weight of each of the battery units 430, 440, 450, and 460. Also, the battery charging control apparatus 410 may calculate k$_n$ according to Equation 7 as shown above, and define an output value of each of the plurality of DCHs 431, 441, 451, and 461 based on k$_n$ and the required physical quantity of the low voltage load. In detail, the battery charging control apparatus 410 defines the output values as follows:

$$I_{target\_1} = k_1 \times I_{target\_total} \text{ or } P_{target\_1} = k_1 \times P_{target\_total}$$

$$I_{target\_2} = k_2 \times I_{target\_total} \text{ or } P_{target\_2} = k_2 \times P_{target\_total}$$

$$I_{target\_3} = k_3 \times I_{target\_total} \text{ or } P_{target\_3} = k_3 \times P_{target\_total},$$
and $$I_{target\_4} = k_4 \times I_{target\_total} \text{ or } P_{target\_4} = k_4 \times P_{target\_total}.$$

Depending on examples, the battery charging control apparatus 410 may define an input value of each of the DCHs 431, 441, 451, and 461 based on k$_n$ and the required physical quantity of the low voltage load. In detail, the battery charging control apparatus 410 defines the input values as $I_{DCH\_1}=k_1\times I_{target\_total}$, $I_{DCH\_2}=k_2\times I_{target\_total}$, $I_{DCH\_3}=k_3\times I_{target\_total}$, and $I_{DCH\_4}=k_4\times I_{target\_total}$, respectively.

Table 3 below shows an example of information used when the battery charging control apparatus 410 defines I$_{target\_1}$ through I$_{target\_4}$. Table 3 may be applicable to define I$_{DCH\_1}$ through I$_{DCH\_4}$. In Table 3, the weight is the weight of Table 2.

TABLE 3

| | Weight ε$_n$, g = 0.1 | k$_n$ | Output value I$_{target\_n}$, I$_{target\_total}$ = 20 A |
|---|---|---|---|
| Battery unit 430 | −0.115 | 0.205 | 4.1 = 0.205 × 20 |
| Battery unit 440 | 0.147 | 0.263 | 5.26 = 0.263 × 20 |
| Battery unit 450 | 0.144 | 0.257 | 5.14 = 0.257 × 20 |
| Battery unit 460 | 0.154 | 0.275 | 5.5 = 0.275 × 20 |

The battery charging control apparatus 410 may generate a control signal for controlling the DCHs 431, 441, 451, and 461 based on I$_{target\_1}$ through I$_{target\_4}$, respectively. An operation of each of the DCHs 431, 441, 451, and 461 is described with reference to FIG. 4A and further description is omitted.

In the example of FIG. 4, I$_{charger}$ may be determined based on the required physical quantity of the low voltage load. Thus, it is possible to efficiently charge the battery units 430, 440, 450, and 460, and to efficiently supply a power to the low voltage load. Also, equalization charging of the battery units 430, 440, 450, and 460 may be performed based on an operation of the battery charging control apparatus 410.

Figure 5:
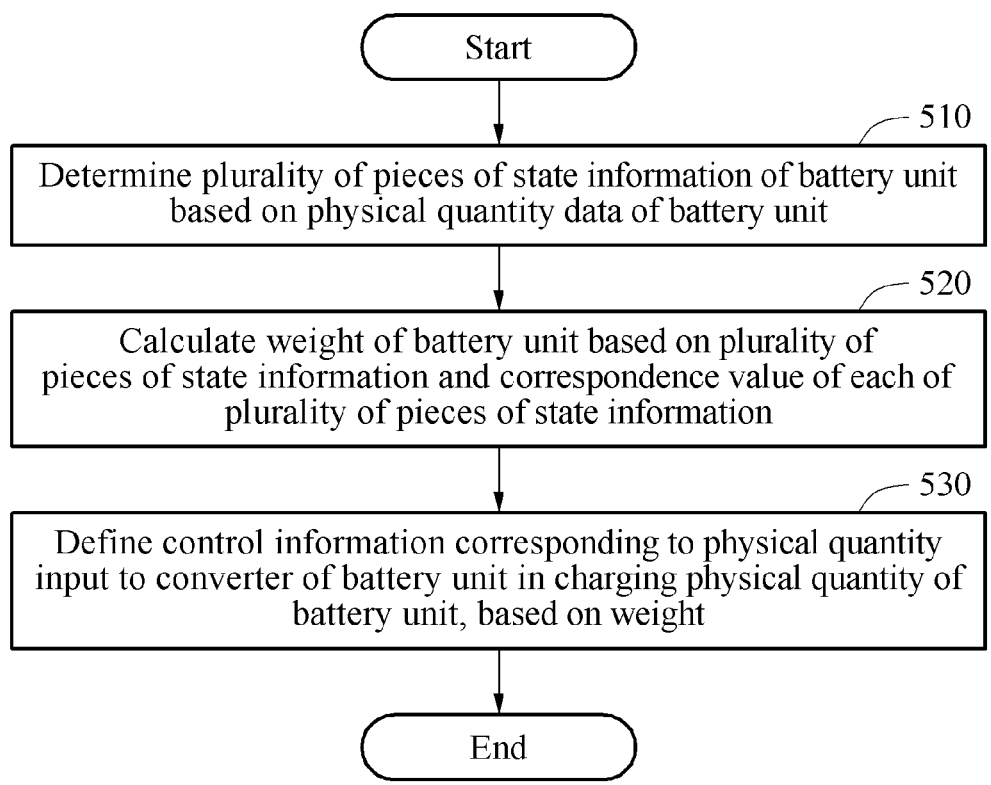
FIGS. 5 and 6 are flowcharts illustrating examples of methods for controlling a charging of a battery.
Figure 6:
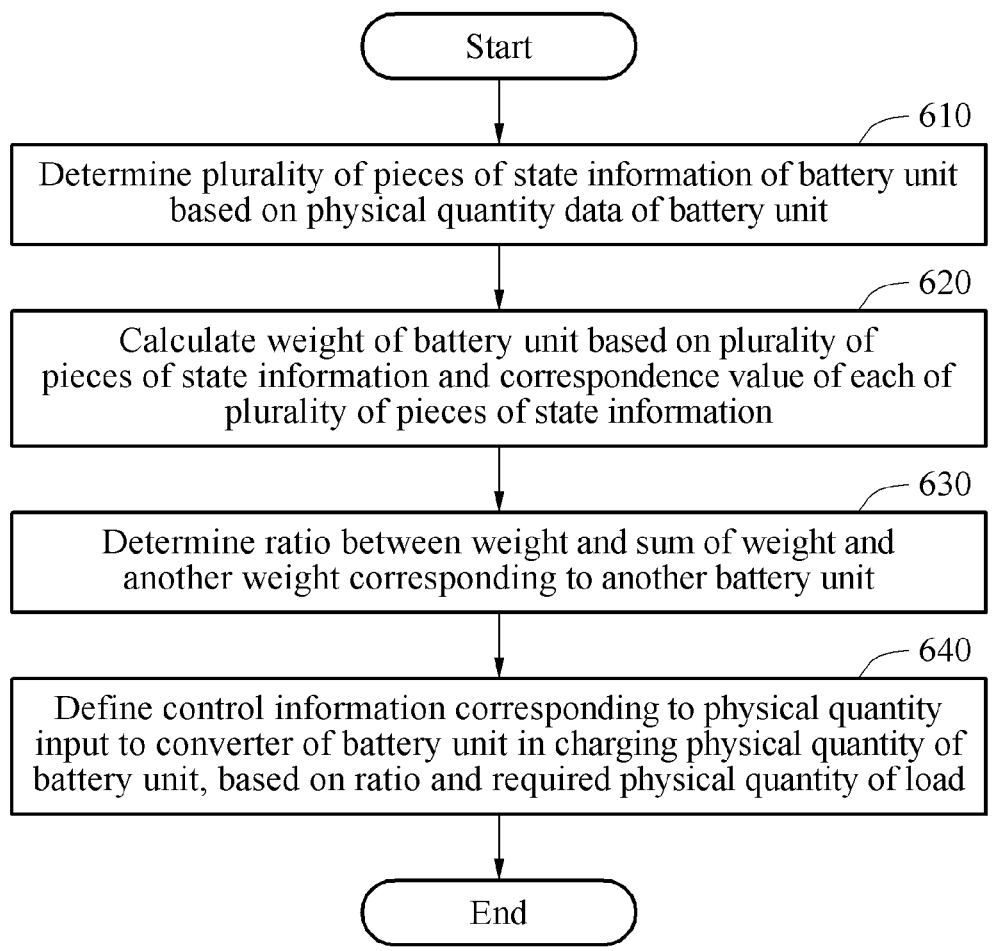

FIGS. 5 and 6 illustrate examples of a method of controlling a charging of a battery. The examples of FIGS. 5 and 6 may be performed at the battery charging control apparatus.

Referring to FIG. 5, in operation 510, the battery charging control apparatus determines pieces of state information of a battery unit based on sensed physical quantity of the battery unit. The battery charging control apparatus may determine the correspondence value of each of the pieces of state information based on a result of comparing each of the pieces of state information and statistical information corresponding to each of the pieces of state information. In an example, the battery charging control apparatus determines a correspondence value of first state information among a plurality of correspondence values based on a result of a comparison. The comparison is between the first state information, for example, SOH, and average information, for example, SOH$_{average}$, corresponding to the first state information. Also, the battery charging control apparatus determines a correspondence value of second state information among a plurality of correspondence values based on a result of another comparison. The second comparison is between the second state information, for example, SOC, and average information, for example, SOC$_{average}$, corresponding to the second state information.

In operation 520, the battery charging control apparatus calculates a weight of the battery unit based on the pieces of state information and a correspondence value of each of the pieces of state information. In one example, the battery charging control apparatus performs an operation based on a value acquired by deducting first state information of the battery unit from a value, for example 1, and a correspondence value of the first state information. Also, the battery charging control apparatus may perform another operation based on a ratio between second state difference, for example, ΔSOC, information of the battery unit and a combination of average information corresponding to the second state information, a correspondence value of the second state information, and a gain. Here, the battery charging control apparatus may define a sum of a result of the operation and a result of the other operation as the weight.

In operation 530, the battery charging control apparatus defines, based on the weight, control information corresponding to an input physical quantity in a charging physical quantity of the battery unit, where the input physical quantity is input into a converter of the battery unit. The control information is information used to control the converter, and denotes an input value or an output value of the aforementioned converter or DCH. The battery charging control apparatus may define the control information according to Equation 6, and may define $\varepsilon \times I_{charger}$ as the control information.

The battery charging control apparatus may generate a control signal based on the control information, and may transmit the control signal to the converter or a controller that controls the converter. The converter operates in response to the control signal and the physical quantity corresponding to the control information is input to the converter. As described above with FIG. 4A, $I_{DCH\_n}$ may be input to the converter and the converter may output $I_{target\_n}$. The description made above with reference to FIGS. 1A through 4B may be applicable to FIG. 5 and a further description is omitted here.

Referring to FIG. 6, in operation 610, the battery charging control apparatus determines pieces of state information of a battery unit based on physical quantity data of the battery unit. In operation 620, the battery charging control apparatus calculates a weight of the battery unit based on the pieces of state information and a correspondence value of each of the pieces of state information. In operation 630, the battery charging control apparatus determines a ratio between the weight and a sum of the weight and another weight corresponding to another battery unit. For example, the battery charging control apparatus may determine the ratio k of a battery unit according to Equation 7 shown above.

In operation 640, the battery charging control apparatus defines, based on the ratio and a physical quantity utilized by a low voltage load, control information corresponding to an input physical quantity in a charging physical quantity of the battery unit, where the input physical quantity is input to a converter of the battery unit. Here, the control information denotes an input value or an output value of the converter. The battery charging control apparatus may define the control information according to the above Equation 7. The battery charging control apparatus may define $k \times I_{target\_total}$ or $k \times P_{target\_total}$ as control information. The description made above with reference to FIGS. 1A through 4B may be applicable to FIG. 6 and a further description is omitted here.

Figure 7:
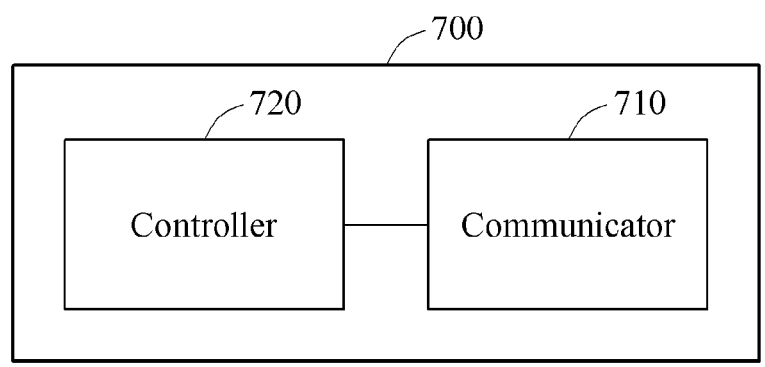
FIG. 7 is a block diagram illustrating an example of a battery charging control apparatus.

FIG. 7 illustrates an example of a battery charging control apparatus. Referring to FIG. 7, a battery charging control apparatus 700 includes a controller 710 and a communicator 720. The controller 710 determines pieces of state information of a battery unit based on a sensed physical quantity of the battery unit. The controller 710 calculates a weight of the battery unit based on the pieces of state information and a correspondence value of each of the pieces of state information. The controller 710 defines, based on the weight, control information corresponding to an input physical quantity in a charging physical quantity of the battery unit, where the input physical quantity is input to a converter of the battery unit.

The communicator 710 transmits a control signal based on the control information. For example, the communicator 720 may transmit the control signal to the converter of the battery unit or to a controller that controls the converter of the battery unit. The battery charging control apparatus 700 may include a non-transitory memory. The memory may store an instruction associated with an operation of the controller 710, such as instructions to control the one or more processors to perform the one or more or all operations described herein. The controller 710 is also representative of a memory and one or more processors configured to implement one or more or all operations described herein. Thus, the controller 710 may perform the aforementioned battery charging control method by executing the instruction. The description made above with reference to FIGS. 1A through 6 may be applicable to FIG. 7 and a further description is omitted here.

Figure 8:
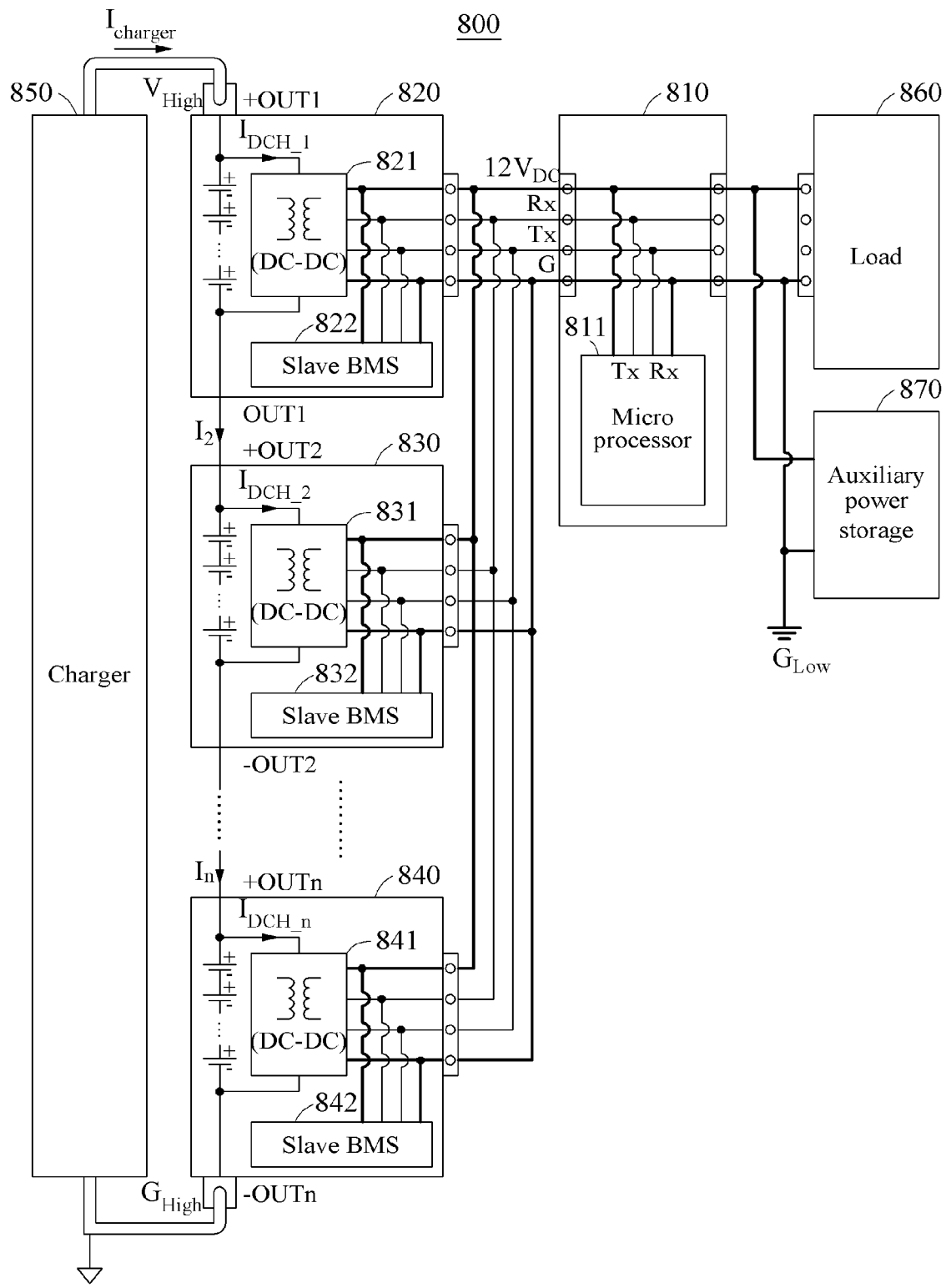
FIG. 8 illustrates an example of a battery system.

FIG. 8 illustrates an example of a battery system. Referring to FIG. 8, a battery system 800 includes a master battery management system (BMS) 810 and battery units 820, 830, and 840. Each of the battery units 820, 830, and 840 may represent a battery module.

Each of the battery units 820, 830, and 840 includes a corresponding slave BMS 822, 832, or 842 and a corresponding DCH 821, 831, or 841. In the example of FIG. 8, each of the slave BMSs 822, 832, and 842 is included in the corresponding battery unit 820, 830, or 840. It is provided as an example only and each of the slave BMSs 822, 832, and 842 may be present outside the corresponding battery unit 820, 830, or 840. Each of the slave BMSs 822, 832, and 842 may sense one of voltage, current, temperature, and impedance of the corresponding battery unit 820, 830, or 840, or any combination thereof. Accordingly, a physical quantity of each of the battery units 820, 830, and 840 may be acquired. Each of the slave BMSs 822, 832, and 842 may transmit physical quantity data of the corresponding battery unit 820, 830, or 840 to the master BMS 810.

The master BMS 810 includes a micro control unit (MCU) 811, for example, a micro processor. The MCU 811 receives the physical quantity data of each of the battery units 820, 830, and 840. The MCU 811 may include the aforementioned battery charging control apparatus. That is, the MCU 811 may perform the battery charging control method.

The MCU 811 may transmit control signals corresponding to output values of the DCHs 821, 831, and 841 to the slave BMSs 822, 832, and 842, respectively. Each of the slave BMS 822, 832, and 842 may control the corresponding DCH 821, 831, or 841. Accordingly, a portion of the charging physical quantity for the battery units 820, 830, and 840 is supplied to the corresponding DCH 821, 831, or 841. In detail, in response to output physical quantity $I_{charger}$ of a charger 850 being supplied to the battery unit 820 of the battery pack, the DCH 821 extracts $I_{DCH\_1}$ from $I_{charger}$. The battery unit 820 may be charged with $I_1-I_{DCH\_1}$. Also, the DCH 821 may step down the voltage of $I_{DCH\_1}$ and may output the stepped-down voltage to a load 860 and/or an auxiliary power storage 870. Charging and supplying power to the load 860 may be simultaneously performed.

Once $I_2$ is supplied to the battery unit 830, the DCH 831 extracts $I_{DCH\_2}$ from $I_2$. The battery unit 830 may be charged with $I_2-I_{DCH\_2}$. Similarly, the DCH 841 extracts $I_{DCH\_n}$ from $I_n$ and the battery unit 840 may be charged with $I_n-I_{DCH\_n}$. Accordingly, the battery units 820, 830, and 840 may be equally charged. The description made above with reference to FIGS. 1A through 7 may be applicable to FIG. 8 and a further description is omitted here.

Figure 9:
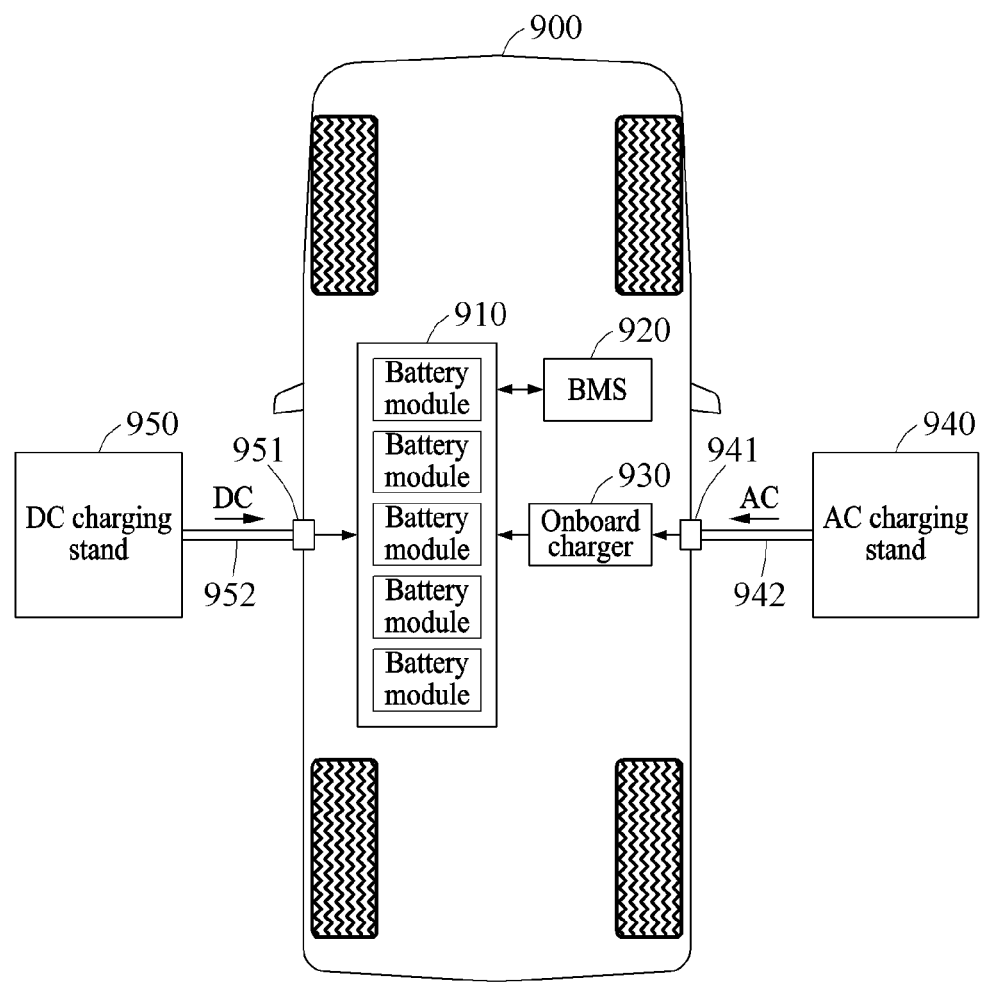
FIG. 9 illustrates an example of charging an electric vehicle.

FIG. 9 illustrates an example of charging an electric vehicle. Referring to FIG. 9, an electric vehicle 900 includes a battery pack 910, a BMS 920, an on-board charger 930, and inlets 941 and 951. The BMS 920 includes the aforementioned battery charging control apparatus.

The electric vehicle 900 may be supplied with power from an alternating current (AC) charging stand 940. A connector (not shown) of a cable 942 of the AC charging stand 940 may be connected to the inlet 941 for charging. In one example, a charge event occurs. The AC charging stand 940 supplies AC power to the on-board charger 930 through the cable 942. The on-board charger 930 converts the AC power to DC power, and supplies the DC power to the battery pack 910. $I_{charger}$ of FIG. 4A may be supplied to the battery pack 910. In response to the occurrence of the charging event, the BMS 920 generates a control signal based on a required physical quantity of a low voltage load, and transmits the control signal to the on-board charger 930. The on-board charger 930 may output $I_{charger}$ of FIG. 4B in response to the control signal. The BMS 920 may perform the battery charging control method. Accordingly, battery modules may be equally charged.

Also, the electric vehicle 900 may be supplied with power from a DC charging stand 950. In one example, the electric vehicle 900 is quickly charged. A connector (not shown) of a cable 952 of the DC charging stand 950 may be connected to the inlet 951 for charging. In one example, a charge event occurs. The DC charging stand 950 supplies DC power to the battery pack 910 through the cable 952. $I_{charger}$ of FIG. 4A is supplied to the battery pack 910. Also, the BMS 920 generates a control signal based on a required physical quantity of the low voltage load, and transmits the control signal to the DC charging stand 950 or an off-board charger included in the DC charging stand 950. The DC charging stand 950 outputs $I_{charger}$ of FIG. 4B in response to the control signal. The BMS 920 performs the battery charging control method. Accordingly, battery modules may be equally charged.

The description made above with reference to FIGS. 1A through 8 may be applicable to FIG. 9 and a further description is omitted here. Charging of the electric vehicle 900 of FIG. 9 may be applicable to other physical applications, for example, an energy storage system (ESS).

The battery charging control apparatus 410, the charger 420, the differential charge handlers (DCHs) 431/441/451/461, the communicator 710, the controller 720, the master battery management system (BMS) 810, the slave BMSs 822/832/842, DCHs 821/831/841, the charger 850, and the BMS 920 in FIGS. 4A, 4B, and 7-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 5, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of controlling a charging of a battery, the method comprising:
    determining plural pieces of state information of the battery based on a sensed physical quantity of the battery;
    calculating a weight of the battery based on the plural pieces of state information and a correspondence value of each of the plural pieces of state information;
    defining control information based on a physical quantity utilized by a load and a ratio between the weight and a sum of the weight and another weight corresponding to another battery; and
    controlling the charging of the battery by controlling a converter of the battery using the control information.

2. The method of claim 1, further comprising:
    determining the correspondence value of each of the plural pieces of state information based on a result of comparing each of the plural pieces of state information and statistical information corresponding to each of the plural pieces of state information.

3. The method of claim 2, wherein the determining of the correspondence value comprises:
    determining a correspondence value of first state information from among a plurality of correspondence values based on a result of comparing the first state information with average information corresponding to the first state information; and
    determining a correspondence value of second state information from among the plurality of correspondence values based on a result of comparing the second state information with average information corresponding to the second state information.

4. The method of claim 3, wherein the calculating of the weight comprises:
    defining a first weight component based on the correspondence value of the first state information and a value acquired by deducting the first state information from a preset value;
    defining a second weight component based on a correspondence value of the second state information, a gain, and a ratio between second state difference information and average information corresponding to the second state information; and
    defining, as the weight, a sum of the first weight component and the second weight component,
    wherein the second state difference information indicates a difference between the second state information and the average information corresponding to the second state information.

5. The method of claim 4, wherein the gain is determined within a range that is based on the first state difference information and the second state information, wherein the first state difference information is information indicating a difference between the first state information and the average information corresponding to the first state information.

6. The method of claim 1, wherein the plural pieces of state information comprise available capacity information of the battery and charge state information of the battery, and the calculating of the weight comprises:
    performing an operation based on a correspondence value of the charge state information, average state information of the battery and another battery, difference information between the charge state information and the average state information, the available capacity information, and a correspondence value of the available capacity information; and
    defining a result of the operation as the weight.

7. The method of claim 1, wherein the defining of the control information comprises:
    performing an operation based on the weight and an output value corresponding to an output physical quantity of a charger; and
    defining a result of the operation as the control information.

8. The method of claim 1, wherein the defining of the control information comprises:
- determining a ratio of the weight to a sum of the weight and another weight corresponding to another battery;
- performing an operation based on the ratio and a physical quantity utilized by a load; and
- defining a result of the operation as the control information.

9. The method of claim 8, wherein the controlling comprises:
- generating a control signal based on the physical quantity utilized by the load in response to an occurrence of a charge event; and
- transmitting the control signal to a charger.

10. The method of claim 1, wherein the charging of the battery is performed based on a remaining physical quantity excluding the sensed physical quantity, and the converter is configured to convert an input physical quantity corresponding to the control information and to output the converted physical quantity to a load.

11. The method of claim 1, wherein the controlling comprises:
- transmitting the control information to the converter or to a slave controller for controlling the converter.

12. A non-transitory computer-readable storage medium storing instructions that, when executed by a processor, cause the processor to perform the method of claim 1.

13. A processor-implemented method of controlling a charging of a battery, the method comprising:
- determining plural pieces of state information of the battery based on a sensed physical quantity of the battery;
- calculating a weight of the battery based on the plural pieces of state information and a correspondence value of each of the plural pieces of state information;
- determining a ratio between the weight and a sum of the weight and another weight corresponding to another battery;
- defining control information based on the ratio and a physical quantity utilized by a load; and
- controlling the charging of the battery by controlling a converter of the battery using the control information.

14. The method of claim 13, wherein the defining comprises:
- performing an operation based on the ratio and the physical quantity utilized by the load; and
- defining a result of the operation as the control information.

15. The method of claim 13, further comprising:
- determining the correspondence value of each of the plural pieces of state information based on a result of comparing each of the plural pieces of state information and statistical information corresponding to each of the plural pieces of state information.

16. The method of claim 15, wherein the determining of the correspondence value comprises:
- determining a correspondence value of first state information from among a plurality of correspondence values based on a result of comparing the first state information with average information corresponding to the first state information; and
- determining a correspondence value of second state information from among the plurality of correspondence values based on a result of comparing the second state information with average information corresponding to the second state information.

17. The method of claim 16, wherein the calculating of the weight comprises:
- defining as a first weight component based on the correspondence value of the first state information and a value acquired by deducting the first state information from a preset value;
- defining as a first weight component based on a correspondence value of the second state information, a gain, and a ratio between second state difference information and average information corresponding to the second state information; and
- defining, as the weight, a sum of the first weight component and the second weight component,
- wherein the second state difference information indicates a difference between the second state information and the average information corresponding to the second state information.

18. The method of claim 17, wherein the gain is determined within a range that is predetermined based on first state difference information and the second state difference information, wherein the first state difference information is information indicating a difference between the first state information and the average information corresponding to the first state information.

19. The method of claim 13, wherein the plural pieces of state information comprise available capacity information of the battery and charge state information of the battery, and the calculating of the weight comprises:
- performing an operation based on a correspondence value of the charge state information, average state information of the battery and another battery, difference information between the charge state information and the average state information, the available capacity information, and a correspondence value of the available capacity information; and
- defining a result of the operation as the weight.

20. The method of claim 13, wherein the controlling comprises:
- generating a control signal based on the physical quantity utilized in response to an occurrence of a charge event; and
- transmitting the control signal to a charger.

21. The method of claim 13, wherein the charging of the battery is performed based on a remaining physical quantity excluding the sensed physical quantity, and the converter is configured to convert input physical quantity corresponding to the control information and to output the converted physical quantity to the load.

22. A non-transitory computer-readable storage medium storing instructions that, when executed by a processor, cause the processor to perform the method of claim 13.

23. A battery charging apparatus for controlling a battery charging, the apparatus comprising:
- a controller configured to
  - determine plural pieces of state information of a battery based on a sensed physical quantity of the battery,
  - calculate a weight of the battery based on the plural pieces of state information and a correspondence value of each of the plural pieces of state information,
  - define control information based on a physical quantity utilized by a load and a ratio between the weight and a sum of the weight and another weight corresponding to another battery, and
  - control the battery charging by controlling a converter of the battery using the control information; and a communicator configured to transmit, in response to the control information, a control signal that controls the battery charging.

24. The apparatus of claim 23, wherein the controller is further configured to:
 determine a ratio of the weight to a sum of the weight and another weight corresponding to another battery,
 perform an operation based on the ratio and a physical quantity utilized by a load, and
 define a result of the operation as the control information.

* * * * *